(12) United States Patent
Follestad et al.

(10) Patent No.: US 12,189,082 B2
(45) Date of Patent: Jan. 7, 2025

(54) SPACE WEATHER FORECASTING

(71) Applicant: UNIVERSITETET I OSLO, Oslo (NO)

(72) Inventors: Anna Fæhn Follestad, Oslo (NO); Lasse B. N. Clausen, Oslo (NO); Jøran I. Moen, Oslo (NO); Wojciech Miloch, Oslo (NO)

(73) Assignee: UNIVERSITETET I OSLO, Oslo (NO)

( * ) Notice: Subject to any disclaimer, the term of this patent is extended or adjusted under 35 U.S.C. 154(b) by 230 days.

(21) Appl. No.: 17/773,304

(22) PCT Filed: Oct. 23, 2020

(86) PCT No.: PCT/EP2020/079888
§ 371 (c)(1),
(2) Date: Apr. 29, 2022

(87) PCT Pub. No.: WO2021/083799
PCT Pub. Date: May 6, 2021

(65) Prior Publication Data
US 2022/0381949 A1 Dec. 1, 2022

(30) Foreign Application Priority Data
Oct. 29, 2019 (GB) .................................. 1915692

(51) Int. Cl.
*G01W 1/10* (2006.01)
*H01J 49/28* (2006.01)
(52) U.S. Cl.
CPC ............ *G01W 1/10* (2013.01); *H01J 49/282* (2013.01)

(58) Field of Classification Search
CPC .......... G01W 1/10; H01J 49/282; Y02A 90/10
See application file for complete search history.

(56) References Cited

U.S. PATENT DOCUMENTS

| | | | |
|---|---|---|---|
| 5,673,366 A | 9/1997 | Maynard et al. | |
| 6,339,747 B1 | 1/2002 | Daly et al. | |

(Continued)

FOREIGN PATENT DOCUMENTS

| | | |
|---|---|---|
| JP | 2004157118 A | 6/2004 |
| WO | 9739433 A2 | 10/1997 |
| WO | 2016185500 A1 | 11/2016 |

OTHER PUBLICATIONS

Sotirelis, T., M. R. Keller, K. Liou, D. Smith, R. J. Barnes, E. Talaat, and J. B. H. Baker (2017), Testing the expanding-contracting polar cap paradigm, J. Geophys. Res. Space Physics, 122, 7077-7086, doi:10.1002/2017JA024238. (Year: 2017).*

(Continued)

*Primary Examiner* — Yoshihisa Ishizuka
(74) *Attorney, Agent, or Firm* — Foley IP Law, PLLC

(57) ABSTRACT

A method of forecasting transport of a region of plasma density enhancement within a polar region is provided. The method comprises: providing a convection model for predicting electrostatic potential distribution within the polar region over time; determining the total electron content distribution within the polar region; and determining whether reconnection is occurring. If reconnection is determined to be occurring, the method comprises: identifying a region of plasma density enhancement using the total electron content distribution; and calculating a velocity of at least a portion of the plasma density enhancement using the convection model, such that transport of a region of plasma density enhancement over time can be forecast.

20 Claims, 1 Drawing Sheet

(56) References Cited

U.S. PATENT DOCUMENTS

| | | | | |
|---|---|---|---|---|
| 2003/0220740 | A1* | 11/2003 | Intriligator | G01W 1/10 |
| | | | | 702/3 |
| 2006/0229813 | A1* | 10/2006 | Tobiska | G01W 1/10 |
| | | | | 702/2 |
| 2015/0325130 | A1 | 11/2015 | Baek et al. | |
| 2018/0120449 | A1* | 5/2018 | Savani-Patel | G01T 1/16 |
| 2019/0146092 | A1* | 5/2019 | MacDonald | G01S 19/072 |
| | | | | 342/357.44 |

OTHER PUBLICATIONS

International Search Report issued Mar. 18, 2021 in connection with PCT International Application No. PCT/EP2020/079888, 4 pages.
Written Opinion issued Mar. 18, 2021 in connection with PCT International Application No. PCT/EP2020/079888, 6 pages.
IPO Search Report dated Apr. 9, 2020 in connection with Great Britain Application No. GB1915692.6, 2 pages.
Eastwood, J.P., "The science of space weather", Royal Society of London, Philosophical Transactions, Mathematical, Physical and Engineering Sciences, vol. 366, No. 1884, Sep. 23, 2008, pp. 4489-4500.
Fæhn Follestad, A. et al., "Polar Cap Patch Prediction in the Expanding Contracting Polar Cap Paradigm", Space Weather, vol. 17, No. 11, Nov. 1, 2019, pp. 1570-1583.
Pierrard, Viviane et al., "Recent Progress in Physics-Based Models of the Plasmasphere", Space Science Reviews 145, 2009, pp. 193-229.

* cited by examiner

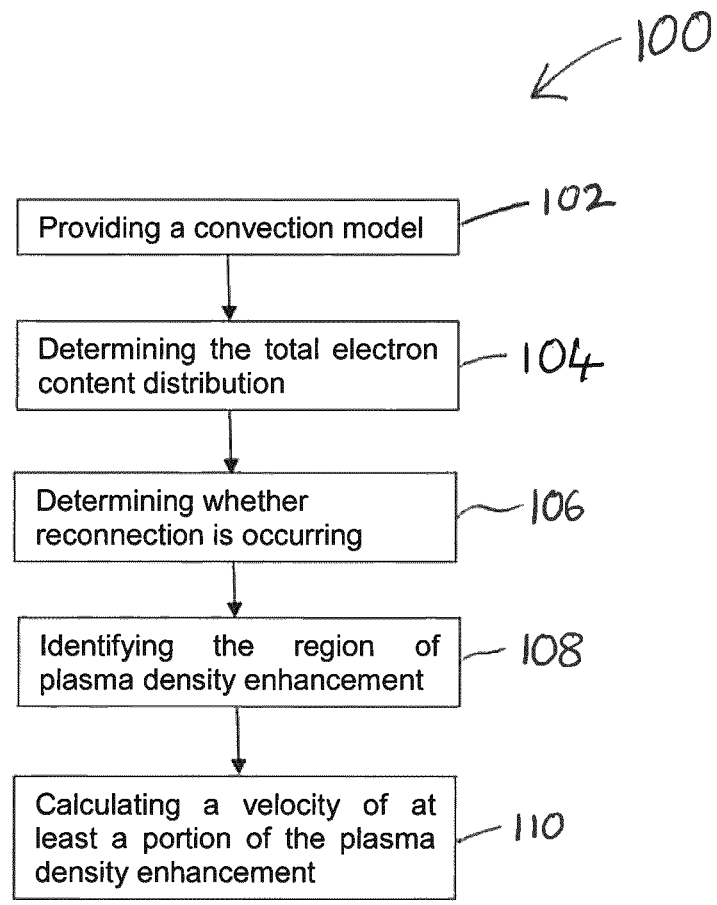

SPACE WEATHER FORECASTING

The invention relates to a method of forecasting transport of a region of plasma density enhancement within a polar region.

Space weather refers to a variety of phenomena that originate from the Sun and affect the Earth's magnetosphere, thermosphere and ionosphere. The term space weather includes many effects of Earth's plasma environment on humans and technology, such as power grid failure, enhanced radiation exposure of airline personnel, damage of near-earth satellites, and disturbances of communication, positioning, and navigation satellite systems. Modern technology relies increasingly upon satellite communication, used for example in positioning and navigation systems. Thus for communication and navigation satellite systems, space weather is an important field of study.

Disturbances on signals propagating through the ionosphere manifest as rapid fluctuations in phase and amplitude, called scintillations. Scintillations are associated with irregularities in electron density (and in particular regions of plasma density enhancement), which are found in events like storm-enhanced density, auroral precipitation and polar cap patches. Scintillations degrade position accuracy, and can cause loss of lock of positioning and navigation satellite systems.

It has been found that the Global Positioning System (GPS) in the polar regions can be affected by phase scintillations. These scintillations may be caused for example by patches of high-density plasma. For example, polar cap patches exiting the polar cap and being pulled into the auroral oval during tail reconnection.

Polar cap patches are clouds of high-density plasma, usually defined as at least two times the density of the surrounding plasma.

When the interplanetary magnetic field (IMF) is directed southward, a twin-cell convection system carries the patches across the polar cap with velocities up to 1000 m/s. When the patch enters the auroral oval, the patch reconfigures into a blob and causes scintillations.

A space weather forecast that could predict the transport of a region of plasma density enhancement across a polar region may be highly beneficial. Industries that rely on positioning and navigation satellite systems, like aviation, agriculture, civil engineering, and the maritime sector may be able to save time, fuel and money if the transport of a region of plasma density enhancement can be predicted.

In a first aspect, the present invention provides a method of forecasting transport of a region of plasma density enhancement within (i.e. across) a polar region; the method comprising: providing a convection model for predicting electrostatic potential distribution within the polar region over time; determining the total electron content distribution within the polar region; and determining whether reconnection is occurring; if reconnection is determined to be occurring, identifying a region of plasma density enhancement using the total electron content distribution; and calculating a velocity of at least a portion of the plasma density enhancement using the convection model over time, such that transport of a region of plasma density enhancement over time within (i.e. across) the polar region can be forecast.

It is known that plasma density enhancements can have adverse effects on human technology such as positioning and navigation satellite systems (e.g. Global Navigation Satellite Systems such as GPS, Galileo etc.). By being able to forecast the transport of these space weather phenomena, it is possible for it to be determined if and when the plasma density enhancement might affect the technology. Precautions, such as not relying on the technology (e.g. Global Navigation Satellite Systems (GNSS)) when it will be affected by the plasma density enhancements, can be taken.

The forecast of transport of the region of plasma density enhancement may comprise predicting the location of the region of plasma density enhancement over time. The spatial and temporal evolution of the region of plasma density enhancement may be predicted.

The polar region may be the north or south polar region. The polar region includes the polar region on Earth and the space above it, including the ionosphere and magnetosphere for example. The plasma density enhancement transport may occur in the polar ionosphere (i.e. the ionosphere above the polar region on Earth). This may be about 350 km above the surface of the Earth at the polar region. Thus more specifically the method may be of forecasting transport of a region of plasma enhancement across (i.e. within) a polar ionosphere.

The convection model may be for predicting electrostatic potential distributions within the polar ionosphere.

The step of determining the total electron content may comprise determining the total electron content within the polar ionosphere.

The reconnection (i.e. magnetic reconnection) may be reconnection that occurs in the magnetosphere above the polar region on Earth. This may in particular occur on the dayside and/or nightside of the magnetosphere. This may be about 35000 km away from Earth's surface.

The step of determining whether reconnection (i.e. magnetic reconnection) is occurring may comprise determining whether reconnection is occurring within the polar magnetosphere.

The step of determining whether reconnection (i.e. magnetic reconnection) is occurring may be performed periodically, e.g. every hour. Alternatively the step of determining whether reconnection is occurring may be performed continuously.

The polar region may be regarded as the region north of 60° north latitude or the region south of 60° south latitude. The polar region may be or comprise the polar cap.

The polar region may be circular. The polar region may be centred on the Earth's geomagnetic pole.

The region of plasma density enhancement may be a region in which the plasma density is greater than the density of surrounding plasma.

The plasma density enhancement may be a polar cap patch. The polar cap patch may be regarded as a region that has at least two times the density of the surrounding plasma.

The convection model may be for modelling plasma motion within the polar region.

The convection model may be for modelling transport of a region of plasma density enhancement when reconnection occurs. The convection model may be for modelling transport of a region of plasma density enhancement from the dayside to nightside of the polar region. This transport may be due to dayside and nightside reconnection.

The size of the convection pattern in the convection model may depend on the position of the open-closed field line boundary.

The convection model may assume that the boundary of the polar region coincides with the open/closed field line boundary.

The convection model may comprise a twin cell convection system.

The convection model may comprise merging gaps. The location and size of the merging gaps within the convection model may be adjustable.

The convection model may comprise/account for flow channels. These flow channels may be mesoscale regions where particle drift velocities are very high, e.g. they may exceed 4000 m/s.

The convection model may account for transformation of the shape of the plasma density enhancement over time. The convection model may for example be used to model the inner dynamics of the plasma density enhancement over time. The convection model may account for possible rotation of the plasma density enhancement over time.

The convection model may be based on real time data of the potential distribution across the polar region and/or polar cap.

The convection model may comprise the SuperDARN (Super Dual Auroral Radar Network) convection map. The convection map may be made using measurements of plasma drift in the ionosphere and fitting the velocities to spherical harmonical functions.

The method may comprise determining, e.g. estimating and/or measuring, the merging gap locations. The merging gap locations may be determined by detecting flow reversal boundaries. The result of this determination of the location of the merging gaps may be input to the convection model.

The convection model may be or comprise the Expanding Contracting Polar Cap (ECPC) paradigm. The ECPC is a model that may explain the high-latitude ionosphere's response to changes in magnetospheric driving (e.g. reconnection).

The ECPC model may be, may comprise and/or may be based on the ECPC model as presented by Freeman, M. P. in 2003 in A unified model of the response of ionospheric convection to changes in the interplanetary magnetic field. Journal of Geophysical Research—Space Physics, 108 (A1). doi: 10.1029/2002ja009385

The ECPC paradigm may be modified to include a nightside merging gap.

The convection model may assume that all magnetic reconnection takes place in merging gaps of half-width, i.e. $\Theta = \pi/6$.

The initial polar cap flux may be input into the convection model. The initial polar cap flux may be measured and/or estimated. For example, the initial polar cap flux may be estimated to be 0.5 GWb. The initial polar cap flux may be estimated based on historical data. The size of the convection pattern of the convection model may depend on the input initial polar cap flux.

A time series of reconnection rates may be input into the convection model. For example, a time series of both the dayside and nightside reconnection rates may be input into the convection model. The reconnection rates over time may be measured and/or estimated. For example, the dayside reconnection rates may be measured. The nightside reconnection rates may be estimated based on the measured dayside reconnection rates.

The nightside reconnection rate may be set to be the same as the dayside reconnection rate.

The dayside and nightside reconnection rates in the convection model may be decoupled. For example, the convection model may have a period of enhanced dayside reconnection rate (which may be referred to as a growth phase) followed by a period of enhanced nightside reconnection rate (which may be referred to as the expansion phase).

It may be assumed that the dayside reconnection is 10 kV higher in the growth phase of a solar storm, while nightside reconnection dominates in the expansion phase. This may for example simulate an expanding and contracting polar cap.

Reconnection rates may be estimated using measured cross polar cap potentials. The cross polar cap potentials may be obtained from Super DARN for example. Reconnection rates on dayside and nightside may be estimated by assuming that the cross-polar cap potential is the average of the dayside and nightside reconnection rates.

The convection model may define three regions. These three regions may be separated by boundaries located at $x_1$ and $x_2$. Latitudes $x > x_1$ may be defined as the polar cap. $X_1$ may be the open/closed field line boundary. Latitudes $x_1 > x > x_2$ may make up the return flow region. $X_2$ may be the equator-ward limit of the convection pattern. This may also be referred to as the Heppner-Maynard boundary. The boundary at $X_2$ may in the model have zero current.

The method may be used to predict the spatial evolution of the region of plasma density enhancement.

The method may predict how the region of plasma density enhancement changes shape as it enters the return flow region.

The determined total electron content distribution may be used to quantify the plasma density at the start of the forecast.

Determining the total electron content distribution may comprise dividing the region of interest into a number of bins, i.e. into a number of areas. The total electron content for each bin may be determined so as to provide the total electron content distribution.

The region of interest may be for example be divided into at least 100 bins, for example, 180 bins.

The total electron content distribution within the region of interest may be determined using historical data. For example, the total electron content distribution may be determined from data measured during a previous solar cycle. In other words, the future total electron content distribution may be estimated based on previous measurements.

For example, the total electron content distribution may be determined by retrieving values from a reference table. The reference table may provide an approximation to the total electron content at a given time at any given location (i.e. any given bin) within the polar region. The given time may be a day so that the reference table may provide an approximation to the total electron content at a given day at any given location within the polar region. Alternatively, diurnal variations may be taken into account if the reference table provides an approximation to the total electron content at some time period less than a day, such at a given hour, at any given location within the polar region.

The determination of the total electron content distribution may provide an estimate for the expected total electron current distribution.

The reference table may be formed using historical measured data. For example, the data may be from MIT's Haystack observatory which may provide total electron content from the global GPS receiver network in given areas, e.g. 1° by 1° areas, every given time period, such as every 5 minutes.

The reference table may be made using total electron content data for 11 years (e.g. 2007-2017) which is the duration of one solar cycle.

Preparing the reference table may comprise, for each bin of the region of interest, taking the median over one month for each day of the solar cycle. For example, for 15 Mar. 2014, the median total electron content value from 28 Feb.

to 30 Mar. 2014 may be taken. Similarly, for 16 Mar. 2014, the median total electron content value from 1 Mar. to 31 Mar. 2014 may be taken. The result may be used to give a total electron content distribution map (e.g. in the form of a reference table) for each day.

Alternatively or additionally, the total electron content may be measured in real-time within the region of interest so as to allow the total electron content distribution to be determined. For example, the total electron content may be measured using the world-wide GPS receiver network. For example, the total electron content may be measured at five minute intervals in 1° by 1° areas. A median filtering may be applied to the measurements. This may eliminate noise by taking the median over a window of data. These real-time measurements may be used to determine a total electron content distribution within the region of interest.

Determining the total electron content distribution and/or identifying a region of plasma density enhancement may comprise taking real time measurements. This may for example be using satellite with Langmuir Probes and/or GPS receivers and/or using ground based observations techniques such as all-sky imagers, GNSS receivers or incoherent scatter radars. These real time measurements may be used to detect/identify the formation and presence of the plasma density enhancement in realtime.

The method comprises determining whether reconnection is occurring because convection/transport of plasma density enhancement may not occur unless reconnection occurs.

The convection may only start once the reconnection rate is greater than 0.

Thus, once a reconnection rate of greater than 0 has been determined (i.e. it is determined that reconnection is occurring) the method comprises tracking how the plasma moves and decays over time through the polar region.

Reconnection, e.g. dayside and nightside reconnection, may allow the region of plasma density enhancement to convect on open field lines in and across the region of interest (e.g. the polar cap). Transportation of plasma density enhancement may occur across the polar region when both dayside and nightside reconnection is occurring.

The method may comprise determining whether reconnection (i.e. magnetic reconnection) is occurring based on the solar wind.

The convection of plasma and hence the convection of the region of plasma density enhancement in the ionosphere may be controlled by the magnetic field of solar wind. The convection of plasma and hence the convection of the region of plasma density enhancement in the ionosphere may only start to occur when the IMF carried by the solar wind has a southward component The method may comprise determining whether reconnection is occurring based on the interplanetary magnetic field (IMF). The IMF may be measured. For example, IMF may be measured using satellite observations at the first Lagrange point (L1).

It may be determined that reconnection is occurring when the IMF z-component, $B_Z$, (i.e. the North-South component) is negative. It may be determined that reconnection is occurring when the IMF is directed southward.

The method may comprise determining whether reconnection is occurring based on the cross polar cap potential. This information may be available from Super DARN.

The method may comprise determining plasma density (e.g. electron density and/or ion density) of the plasma density enhancement over time. This may be done if reconnection is determined to be occurring. It is likely that the region of plasma density enhancement may decrease in density over time. It may be beneficial to track the density over time. This is so it may be forecast whether the plasma density enhancement decreases over time such that it may present less of an issue and/or decrease to a value (i.e. a threshold) such that it may not have an effect on technology such as global navigation satellite systems (GNSS). The method may comprise monitoring whether the plasma density enhancement decreases in density over time to below a threshold. At this point, it may be indicated that the region of plasma density enhancement has effectively gone.

The method may comprise determining (e.g. measuring and/or estimating) a loss rate (i.e. a decay rate). The loss rate ($\beta$) may be between $10^{-1}$ $s^1$ and $10^{-7}$ $s^{-1}$. For example, the loss rate may be estimated to be $\beta=10^{-5}$ $s^{-1}$.

The plasma density of the region of plasma density enhancement over time may be determined using the following equation:

$$n(t)=n_0 \exp\{-\beta_t\}$$

where n(t) is the plasma density, $\beta$ is the loss rate in $s^{-1}$, t is time in seconds since generation of the region of plasma density enhancement, and no is the plasma density at t=0 s, i.e. density upon generation.

The plasma density at t=0 s may be determined from the determined total electron content distribution. The plasma density at t=0 s may be determined by looking up in the reference table the total electron content for the location of generation of the region of plasma density enhancement.

The method may be used to estimate the total electron content intensity in the region of plasma density enhancement over time.

The plasma density of the region of plasma density enhancement may decrease over time. This may mean that the plasma density is lower when the region of plasma density enhancement reaches the nightside of the polar region.

The method may be used to predict how the region of plasma density enhancement moves and decays over time in the polar region.

The method may be used to determine the density gradients at the edge of the region of plasma density enhancement over time. It has been found that a prediction of plasma density gradients may be more valuable in predicting effect of the region of plasma density enhancement on GNSS rather than the absolute value of the density of the region of plasma density enhancement.

The step of calculating the velocity of at least one portion of the plasma density enhancement may comprise calculating the speed and direction of the at least one portion of the plasma density enhancement. The step of calculating the velocity of the plasma density enhancement may comprise calculating the velocity of a plurality of portions of the plasma density enhancement over time.

The method may comprise, upon identifying a region of plasma density enhancement once reconnection has been determined, adding one or more tracer particles to the convection model. These tracer particle(s) may be placed on a portion/point of the convection model it is desired to track, e.g. on a particle or a blob of particles. These tracer particle(s) may be placed on a portion/point of the identified region of plasma density enhancement. The one or more tracer particles may be placed on a determined (i.e. measured or estimated) open-closed field line boundary and/or a merging gap. The position of the open-closed field line boundary may be estimated based on the amount of open flux in the region of interest. One or more tracer particles may be placed at a given time interval, e.g. every minute, for a period of time, e.g. for seven minutes. The step of calculating the velocity of at least one portion of the plasma density enhancement may comprise calculating the velocity at each one or more tracer particle over time. The output may be used to simulate the transport of the region of the plasma density enhancement over time.

The method may be used to produce a simulation that illustrates the transport of the region of plasma density enhancement over time. The simulation may be used to track where the region of plasma density enhancement will be at a given time in the future. This information may be used by GNSS to determine whether the GNSS receiver data will be accurate and/or precise.

The method may be used to predict when and/or where a plasma density enhancement, e.g. a polar cap patch, enters the auroral oval, e.g. the nightside auroral oval. If the position of the auroral oval is determined (either by measuring its position and/or estimating it), the time and/or position at which the plasma density enhancement reaches the auroral oval can be determined from the forecast of the transport of the plasma density enhancement. This may be beneficial as it has been found that the arrival of a region of plasma density enhancement at the auroral oval may cause scintillations that can affect technology such as global navigation satellite systems.

The method may be used to track the spatial evolution of the region of plasma density enhancement as it reaches the auroral oval. In particular it may be used to forecast and simulate the evolution of the region of plasma density enhancement into a boundary blob when it reaches/impacts the auroral oval.

The method may comprise obtaining real time data on the position of the auroral oval. For example, this may be magnetometer data.

The forecast of the transport of a region of plasma density enhancement may mean that it can be predicted where the region of plasma density enhancement will be at a given time in the future.

This information may be used by global navigation satellite systems and/or people using these systems. This is because this information may be used to predict interruptions and/or disturbances to GNSS signals.

For example, the information may be used to determine if and/or when the region of plasma density enhancement will be in the field of view of a GNSS receiver. The information may be used to determine if and/or when the region of plasma density enhancement will be in a location that means that signals from GNSS satellites have to pass through the region of plasma density enhancement. This information may be useful as scintillations may occur when the region of plasma density enhancement will be in the field of view of a GNSS receiver and/or signals from GNSS satellites have to pass through the region of plasma density enhancement. Thus the information may be used to determine when disturbances, e.g. scintillations, will occur on GNSS systems The information from the method (e.g. a simulation) may be provided in a form that can be accessed via a computer application and/or a website for example.

The information from the method may be received by a GNSS and used to ensure that unreliable signals are not provided.

The method may be carried out by computer. Thus the present invention may be a computer-implemented method comprising one or more of the above described features.

The present invention may provide one or more data processing apparatus/device/system(s) comprising means for carrying out the method of the first aspect (including one or more of the above described optional features).

The apparatus/device/system(s) may have the convection model, and/or total electron content distribution data stored thereon. The apparatus/device/system(s) may be arranged to receive data to allow the determinations to be made.

The apparatus/device/system(s) may comprise one or more processors adapted to perform the method of the first aspect (including one or more of the above described optional features).

The present invention may provide a computer program comprising instructions which, when the program is executed by a computer, cause the computer to carry out the method of the first aspect (including one or more of the above described optional features).

The present invention may provide a computer-readable data carrier having stored thereon the computer program.

The present invention may provide a data carrier signal carrying the computer program.

The present invention may provide a computer-readable storage medium comprising instructions which, when executed by a computer, cause the computer to carry out the method of the first aspect (including one or more of the above described optional features).

A preferred embodiment of the present invention will now be described by way of example only with reference to the accompanying drawings, in which:

FIG. 1 is a flow chart.

The flow chart of FIG. 1 illustrates a method 100 of forecasting transport of a region of plasma density enhancement (such as a polar cap patch) within/across a polar region. This is useful because plasma density enhancement may disturb or interrupt Global Navigation Satellite Systems (GNSS). Thus, the forecast of the transport of a region of plasma density enhancement within/across a polar region may be used to improve the reliability of outputs from GNSS.

The method comprises at least five main steps. These steps include a step 102 of providing a convection model, a step 104 of determining the total electron content distribution, a step 106 of determining whether reconnection is occurring, a step 108 of identifying the region of plasma density enhancement and a step 110 of calculating a velocity of at least a portion of the plasma density enhancement.

The steps do not necessarily need to be performed in the order shown in the flow chart. For example, the step 104 of determining the total electron content distribution may be performed after the step 106 of determining whether reconnection is occurring.

The convection model provided in step 102 is for predicting electrostatic potential distribution within the polar region over time. Thus the convection model may be for predicting the driving forces behind plasma transport.

The convection model may comprise the Expanding Contracting Polar Cap paradigm. The ECPC model may comprise the ECPC model as presented by Freeman, M. P. in 2003 in A unified model of the response of ionospheric convection to changes in the interplanetary magnetic field. Journal of Geophysical Research—Space Physics, 108 (A1). doi: 10.1029/2002ja009385.

The Expanding Contracting Polar Cap paradigm (e.g. that presented by Freeman in 2003) may be modified to include a nightside merging gap. This convection model may comprise one or more of the following features.

The model used in the method may assume that the magnetic field in the high-latitude ionosphere is stationary. This may be reasonable for the timescales considered in the forecast, which may for example be hours. Accepting stationarity, the relationship between the irrotational electrostatic potential $\Phi$ and the associated electric field E may be given by:

$$E = -\nabla\Phi \qquad (1)$$

The current in the polar cap region may be considered as perpendicular to the magnetic field, $J\perp$. The relationship to the electric field may be given by:

$$J\perp = \Sigma_P E + \Sigma_H \hat{B} \times E \qquad (2)$$

where $\hat{B}$ is the unit vector of the magnetic field and $\Sigma_P$ and $\Sigma_H$ are the height-integrated Pedersen and Hall conductivities, respectively.

Uniform conductivity in the polar cap and return flow region may be assumed. This may imply that the field aligned currents are restricted to the boundaries between regions. There are no field aligned currents into or out of the ionosphere polar cap, so the divergence of the perpendicular current may be taken as zero (i.e. $\nabla \cdot J_\perp = 0$).

Taking the divergence on both sides of equation (2) and substituting for E by equation (1) may reduce the current problem to that of solving Laplace's equation in the polar cap and on the polar cap boundary which may be:

$$\nabla^2\Phi = 0 \qquad (3)$$

It may be assumed that there is no spatial gradient in the Pedersen and Hall conductivities. It may also be assumed that the ionosphere is a thin, spherical shell, such that equation (3) has two variables, colatitude $\lambda$ and local time $\theta$. The coordinate system may be oriented such that $\theta=0$ at local midnight, $\theta=\pi/2$ at 06 magnetic local time (MLT) and $\theta=\pi$ at magnetic local noon. Laplace's equation (3) may then be written as:

$$\nabla^2\Phi = \frac{\partial^2\Phi}{\partial x^2} + \frac{\partial^2\Phi}{\partial \theta^2} = 0 \qquad (4)$$

This includes the substitution $x=\ln\{\tan(\lambda/2)\}$. The convection model may assume that the polar cap boundary coincides with the open/closed field line boundary, and that it is circular and centred on the Earth's geomagnetic pole.

It may be assumed that all magnetic reconnection takes place in merging gaps of half-width $\Theta=\pi/6$, i.e. $\Theta_N=\Theta_D=\pi/6$. The corresponding lengths may be $l_D=2\Theta_D R_E \sin(\lambda_1)$ and $l_N=2\Theta_N R_E \sin(\lambda_1)$ where $R_E$ is the Earth's radius and $\lambda_1$ is the colatitude of the polar cap boundary. The gaps may be centred at $\theta=0$ for the nightside gap and $\theta=\pi$ for the dayside gap. The remainder of the polar cap boundary may be considered adiaroic, i.e. there is no plasma flow across the boundary.

The model may define three regions separated by boundaries located at $x_1$ and $x_2$. Latitudes $x>x_1$ may be defined as the polar cap, and the $x_1$ may be the open/closed field line boundary. Latitudes $x_1>x>x_2$ may make up the return flow region, such that $x_2$ may be the equatorward limit of the convection pattern. This may be referred as the Heppner-Maynard boundary. Latitude equatorward of $x_2$ have zero current in this model.

The amount of open magnetic flux in the polar cap, $F_{PC}$, may vary with the amount of dayside $\Phi_D$ and nightside $\Phi_N$ reconnection:

$$\frac{dF_{PC}}{dt} = \Phi_D - \Phi_N \qquad (5)$$

For a dipolar magnetic field with strength B and a given polar cap flux, the polar cap boundary radius $\lambda_1$ may be found from:

$$F_{PC} = 2\pi B R_E^2 \sin^2(\lambda_1) \qquad (6)$$

Equations 5 and 6 may be used to find the location of the open/closed field line boundary for a given polar cap flux, and from its derivative, may be used to find the speed at which the boundary moves, $v_{\lambda_1}$:

$$v_{\lambda_1} = \frac{\Phi_D - \Phi_N}{2\pi R_E^2 B \sin(2\lambda_1)} \qquad (7)$$

The electric field along the adiaroic portions of the boundary may be given by $E=-V\times B$.

The electric field component parallel to the polar cap boundary around the circumference may be found from:

$$E_\theta(\lambda_1, \theta) = \begin{cases} -v_{\lambda_1} B_r & \text{if } \theta_N < |\theta| < \pi - \theta_D \\ -v_{\lambda_1} B_r + \dfrac{\Phi_D}{l_D} & \text{if } |\theta| > \pi - \theta_D \\ -v_{\lambda_1} B_r - \dfrac{\Phi_N}{l_N} & \text{if } |\theta| < \pi - \theta_N \end{cases} \qquad (8)$$

$B_r$ is the radial component of the Earth's magnetic field, such that $B_r = 2B \cos\lambda$ The potential at the polar cap boundary $x_1$ may be found by integrating the electric field around the boundary, Ee:

$$\Phi_{\lambda_1} = -R \sin\lambda_1 \int_0^\theta E_\theta(\lambda_1, \theta) d\theta \qquad (9)$$

Using the polar cap boundary, it may be possible to find the solution for the rest of the polar region by the following equation.

$$\Phi(x, \theta) = \begin{cases} \sum_{m=1}^\infty c_m \exp m(x - x_1) \sin(m\theta) & \text{if } x \leq x_1 \\ \sum_{m=1}^\infty c_m \dfrac{\sinh m(x - x_2)}{\sinh m(x_1 - x_2)} \sin(m\theta) & \text{if } x_1 < x \leq x_2 \\ 0 & \text{if } x > x_2 \end{cases} \qquad (10)$$

$c_m$ may be the coefficients of a Fourier expansion of the potential at the polar cap boundary as follows:

$$c_m = \frac{1}{m}\int_0^{2\pi} \Phi_{x_1}(\theta)\sin(m\theta)d\theta \qquad (11)$$

m may be given a predetermined value. For example, m may be set as follows: m=1.20.

Solving equation (10) for each time step may allow calculation of the flow speed using $V = E \times B$ such that:

$$v_\lambda = -\frac{E_\theta}{B_r}, v_\theta = \frac{E_\lambda}{B_r} \qquad (12)$$

The initial polar cap flux may be input to the model to define the boundary locations of different flow regimes. This may for example be 0.5 GWb. A time series of both the dayside and nightside reconnection rates may also be input.

This information may be measured in real time or based on data measured in real time and/or estimated based on historical data.

The model may also assume that the dayside reconnection is 10 kV higher in the growth phase of the storm, while nightside reconnection dominates in the expansion phase. This may simulate an expanding and contracting polar cap.

The method also comprises determining the total electron content distribution within the polar region (step 104), specifically within the ionosphere of the polar region. This may be achieved by using historical data of total electron content in the polar region over a previous solar cycle. This may provide an empirical model of the ionospheric total electron content distribution in the polar region.

As an example for the Northern polar region, this may be achieved using data from MIT's Haystack observatory, which provides TEC from the global GPS receiver network in 1° by 1° bins in the polar region every 5 minutes. To obtain a reference TEC distribution for the northern polar cap, TEC data has been obtained for 11 years 2007-2017, the duration of one solar cycle. The long-term variations between different solar cycles are not taken into account. This is achieved by taking magnetic latitudes from 60 degrees and northward, and dividing the polar cap into 30 bins in the latitudinal direction and 60 bins in the longitudinal direction. For each bin, the median over one month for each day of the solar cycle is taken. For example, for 15 Mar. 2014, the median TEC value from 28 Feb. to 30 Mar. 2014 was taken. Similarly, for 16 Mar. 2014, the median TEC value from 1 Mar. to 31 Mar. 2014 was taken. The result is a TEC distribution map for each day.

The rolling median smoothes out daily variations, while retaining the monthly, seasonal and yearly variations.

It has been found that the TEC concentration is always higher on the dayside, while simultaneously also varying more.

The method comprises step 106 of determining whether reconnection is occurring. This may be achieved by any known method but in the present example is achieved using satellite observations of the interplanetary magnetic field (IMF) at the first Lagrange point (L1). The determination may be performed (e.g. periodically or continuously) until it has been determined that reconnection is occurring.

Once reconnection is occurring (e.g. on the dayside and the nightside), the plasma in the ionosphere may be convected and thus the convection model is applicable to being able to predict the transport of a region of plasma density enhancement within the polar region.

Once reconnection has been determined to be occurring, the method may comprise step 108 of identifying a region of plasma density enhancement. This is done using the determined total electron content. For example, the region of plasma density enhancement may be achieved by retrieving data from the reference data formed from the historical data.

Once a region of plasma density enhancement has been identified the method comprises performing step 110 that involves calculating a velocity of at least a portion of the plasma density enhancement using the convection model, such that transport of a region of plasma density enhancement over time can be forecast.

The information may be output in the form of a simulation that illustrates the transport of a region of plasma density enhancement over time.

The method may comprise providing an output of where the plasma density enhancement will be over time. This information can be used to determine whether the plasma density enhancement will interfere with GNSS. If so, appropriate action can be taken so that unreliable outputs from the GNSS can be identified and ensured that it is not relied upon. This output may for example be a simulation.

Once a region of plasma density enhancement has been identified, the method may comprise putting one or more tracer particles in the convection model to indicate the location of the plasma density enhancement at the start of the convection. The velocity of each of these tracer particles may be determined overtime so as to allow modelling of the transport of the plasma density enhancement over time.

The method may additionally comprise quantifying the loss rate of a plasma density enhancement traversing the polar region. It may be assumed that the electron density is equal to the O+ density in the F region, and a thin ionosphere at 350 km altitude. Based on this the loss rate may be estimated to be $\beta=10^{-5}$ s$^{-1}$. The electron density of the plasma density enhancement over time is given by:

$$n(t)=n_0 \exp\{-\beta t\} \quad (13)$$

where n(t) is the electron density, $\beta$ is the loss rate in s$^{-1}$, t is time in seconds since plasma density enhancement generation, and no is the electron density at t=0 s. In the forecasting method, the plasma density enhancement density n(t) is calculated by using TEC at t=0 s, estimated from the determined total electron content distribution as $n_0$, and loss rate $\beta$ as explained above. Equation (13) may thus be used to give the plasma density enhancement density at every time step. This information may be input to the convection model.

The method may be used to predict when the plasma density enhancement arrives at the nightside auroral oval. This may be achieved by determining (e.g. measuring or estimating) the position of the nightside auroral oval and using the calculated velocity of at least a portion of the plasma density enhancement to forecast when the plasma density enhancement will reach the nightside auroral oval.

The convection model may also be used to calculate the shape and size of the plasma density enhancement over time.

The method has been validated by comparing the results from the forecasting method to observations from GPS TEC data from the MIT's Madrigal Database, convection data from SuperDARN radar network, and scintillation data from Svalbard for an event in the evening of 26 Sep. 2011, from 18:00 UT to 22:00 UT. The event was caused by a coronal mass ejection (CME) on 24 Sep. 2011 which impacted with the magnetosphere two days later, and caused auroral activity, patches in the polar cap and scintillations on GPS signals. In terms of geomagnetic indices, the storm resulted in Kp=6 from about 18-21 UT, corresponding to a geomagnetic storm level G2 in the National Oceanic and Atmospheric Administration (NOAA) classification system.

The results show that the method can be used to describe plasma density enhancement motion well, and can be used to predict scintillations of GPS signals in the polar region.

The invention claimed is:

1. A method of using a Global Navigation Satellite System (GNSS), comprising forecasting transport of a region of plasma density enhancement within a polar region; the method comprising:
    providing a convection model for predicting electrostatic potential distribution within the polar region over time;
    determining total electron content distribution within the polar region;
    determining whether reconnection is occurring;
    based on determining that the reconnection is occurring:

identifying a region of plasma density enhancement using the total electron content distribution;

calculating a velocity of at least a portion of the plasma density enhancement using the convection model;

forecasting the region of plasma density enhancement over time;

predicting interruptions and/or disturbances to the GNSS signals based on the forecast; and using the GNSS based on the prediction to thereby improve the reliability of outputs from the GNSS.

2. The method according to claim 1, wherein the method comprises providing an output indicating where the plasma density enhancement will be over time.

3. The method according to claim 1, wherein the convection model comprises an Expanding Contracting Polar Cap paradigm.

4. The method according to claim 1, wherein the total electron content distribution is obtained from a reference table that provides an approximation to the total electron content at any given day and/or any given location in the polar region.

5. The method according to claim 4, wherein the reference table is formed using historical measured data.

6. The method according to claim 1, wherein the method comprises measuring interplanetary magnetic field (IMF) to determine whether reconnection is occurring.

7. The method according to claim 1, wherein the method comprises determining that reconnection is occurring when Interplanetary magnetic field (IMF) $_z$-component, $B_z$, is negative.

8. The method according to claim 1, wherein the method comprises determining the plasma density of the region of plasma density enhancement over time.

9. The method according to claim 1, wherein the method comprises determining the density gradients at the edge of the region of plasma density enhancement over time.

10. The method according to claim 1, wherein the method comprises determining a time and/or location that the plasma density enhancement will impact an auroral oval.

11. The method according to claim 10, wherein the method comprises determining the location of the auroral oval.

12. The method according to claim 1, wherein the method comprises determining if and/or when the region of plasma density enhancement will be in the field of view of a Global Navigation Satellite Systems (GNSS) receiver.

13. The method according to claim 1, wherein the method comprises, upon identifying a region of plasma density enhancement once reconnection has been determined, adding one or more tracer particles to a point of the convection model, and wherein the step of calculating the velocity of at least one portion of the plasma density enhancement comprises calculating the velocity at each one or more tracer particle over time.

14. The method according to claim 1, wherein information from the method is provided in a form that can be accessed via a computer application and/or a website.

15. A system for improving a Global Navigation Satellite System (GNSS) by forecasting transport of a region of plasma density enhancement within a polar region, the system comprising:

a processor;

a convection model for predicting electrostatic potential distribution within the polar region over time;

a non-transitory computer-readable medium storing instructions that are operative upon execution by the processor to:

determine total electron content distribution within the polar region;

determine whether reconnection is occurring;

based on determining that the reconnection is occurring:
identify a region of plasma density enhancement using the total electron content distribution;
calculate a velocity of at least a portion of the plasma density enhancement using the convection model,
forecast a region of plasma density enhancement over time;
predict interruptions and/or disturbances to the GNSS signals based on the forecast; and use the GNSS based on the prediction to thereby improve the reliability of outputs from the GNSS.

16. The system as claimed in claim 15, wherein the instructions are further operative to: provide an output indicating where the plasma density enhancement will be over time.

17. The system as claimed in claim 15, the system comprising a memory with total electron content distribution data stored thereon.

18. The system as claimed in claim 15, wherein the convection model comprises an Expanding Contracting Polar Cap paradigm.

19. The system as claimed in claim 15, wherein the total electron content distribution is obtained from a reference table that provides an approximation to the total electron content at any given day and/or any given location in the polar region.

20. A non-transitory computer readable medium, executed by a computer, cause the computer to perform operations, the operations comprising:

providing a convection model for predicting electrostatic potential distribution within the polar region over time;

determining total electron content distribution within the polar region;

determining whether reconnection is occurring;

based on determining that the reconnection is occurring:
identifying a region of plasma density enhancement using the total electron content distribution;
calculating a velocity of at least a portion of the plasma density enhancement using the convection model,
forecasting a region of plasma density enhancement over time;
predicting interruptions and/or disturbances to the GNSS signals based on the forecast; and using the GNSS based on the prediction to thereby improve the reliability of outputs from the GNSS.

* * * * *